May 19, 1953 — V. M. WATTS — 2,639,184

LIFTER FOR COOKING UTENSILS

Filed Oct. 13, 1948

INVENTOR.
VERA M. WATTS

Patented May 19, 1953

2,639,184

UNITED STATES PATENT OFFICE 2,639,184

LIFTER FOR COOKING UTENSILS

Vera M. Watts, Plainville, Kans.

Application October 13, 1948, Serial No. 54,259

1 Claim. (Cl. 294—92)

This invention relates to an implement for lifting hot pans or pie tins from an oven and has equipment for handling hot covers on cooking vessels and the like.

Briefly the invention comprises a flexible fork shaped lifting element secured to a hinged handle which may be folded against the lifting element for storing or shipment in dozen or gross lots, the handle preferably being made of stiff wire and bent upon itself to form two aligned spaced sides, while intermediate the ends of the handle the side wires are bulged outward to form an enlarged area that may be snapped over the knob like handle provided on most utensil covers so they may be lifted from a cooking pan or the like without burning the fingers.

It is therefore, an object of the invention to provide a fork shaped lifting element in an oven utensil that has flexible tines so spaced that they will enter between the grids of the ordinary oven shelf and thereby pass under a pie tin or other vessel to lift it from the shelf and which is provided with a handle hinged to the lifting element so it may be folded over the lifting element to conserve space in storage or shipment.

It is a further object of the invention to provide a lifting utensil having flexible fork shaped tines that may be passed under a pie tin or other cooking utensil in an oven to lift it from the oven, and provided with a hinged handle having an oblong opening therein intermediate its ends for passing over the knob like handle on most vessel covers to lift it from a hot cooking vessel.

Other objects and advantages will appear as the description progresses, reference being now had to the drawings accompanying this specification wherein like characters represent like parts in the several views, it being understood that the drawings are not necessarily made to scale and that some parts may be more or less exaggerated to more clearly show the construction and operation and that modifications may be made from the showing without departing from the spirit and scope of the invention as covered by the attached claim.

The numeral 1 represents the lifting element, 2 the handle, 3 the pivot securing the handle to the lifting element, 4 the bulged out area in the handle for engaging the knob like handles of cooking utensil covers. 5 represents a bent portion of the handle resting under the lifting element to hold it in proper alignment during a lifting operation. 6 are the flexible tines provided on the lifting element 1 so spaced that they will enter between the grid wires in most oven shelves, which permits placing the lifting element under the pie tin or other cooking utensil before lifting so as to not displace the tin before a good engagement.

7 are bent sides on the rear of the lifting element to stiffen the back thereof so that it will not flex after a heavy pie tin has been engaged, as sometimes the pie filling boils out and becomes burned onto the shelf grids and will then tend to adhere quite firmly so that it might be very difficult to get the lifter under such a pie tin without displacing it on the shelf, and the stiffened back of the lifter will enable a considerable force to be applied to get the tin loosened from a burned on filling adhering to the grids.

The hinged handle folded over the lifting element reduces the overall dimension of the utensil when packed away in storage or for shipment.

Figure 1:
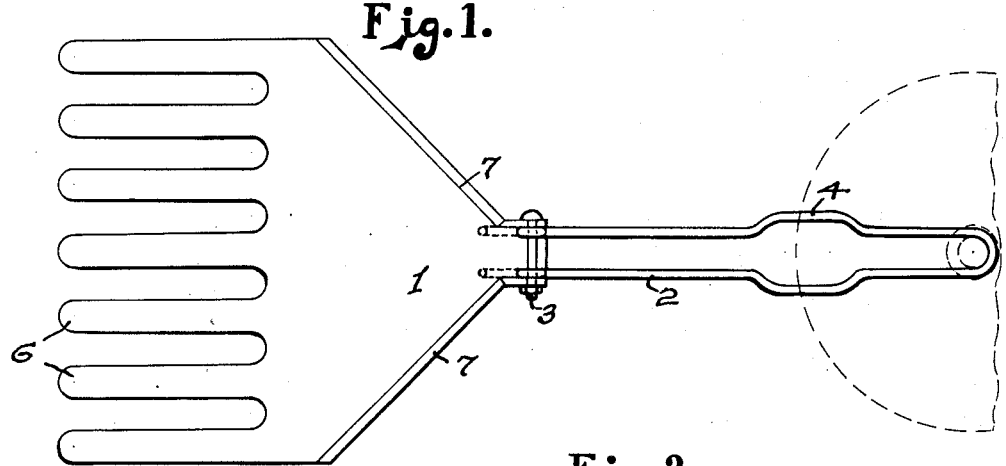
Figure 1 represents a plan view of the lifting utensil with the handle extended and showing the bulged area for engaging the knob like handles of cooking utensil covers.
Figure 2:
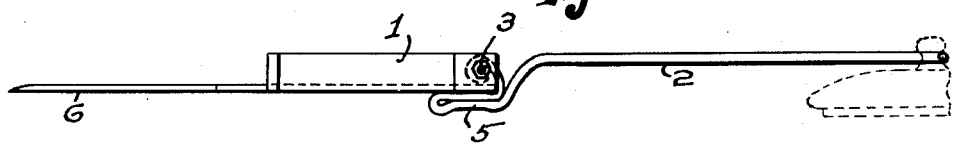
Figure 2 is a side elevation of Figure 1 showing the parts in the same relative positions.
Figure 3:
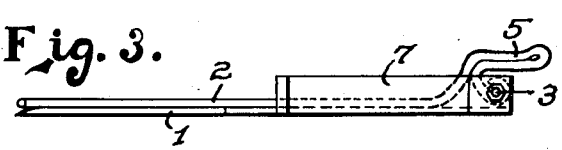
Figure 3 is also a side elevation showing the handle folded over the lifting element.

With the handle 2 in extended position, as shown in Figs. 1 and 2, the bulged opening 4 in the handle serves admirably for engaging the hot knob like handles on cooking utensil covers. When used in this manner, the bulged or expanded section 4 of the handle 2 is dropped over the head or enlarged portion of the knob and the handle 2 is moved longitudinally in either direction so that the substantially parallel and more narrowly spaced apart lengths of the wire will straddle the neck or narrower part of the knob under the head. The knob is thus engaged to raise the hot cover. An advantage in this form of the device is that the lifter element 1 can be turned around and used for a temporary handle. This will remove the operator's hand farther away from the hot cover for the knob is then held in the upper end of the handle 2, as shown in dotted lines in Figs. 1 and 2.

Figure 4:
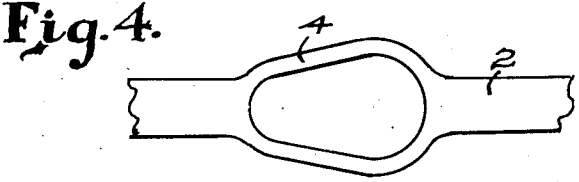
Figure 4 is a sectional view of a handle made of solid metal instead of a spring metal with a tapered hole so that the knob handle or shank of a kettle lid may be entered into the large end of the slot and slid forward to grip the handle to lift the lid.

While the handle shown is made of wire it is understood that it could as well be made of a casting with the bulged hole tapering as shown in Figure 4 in which case the large end of the opening would be large enough to pass over the largest knob handle and then pushed toward the knob when it would find a seat somewhere along the taper when the lid or cover could be lifted.

What I claim as new and desire to secure by Letters Patent is:

A kitchen utensil including a wire handle attached thereto, said handle being of substantial length and formed in a substantially flat elongated U-shape, the substantially straight parallel lengths of wire in said handle being formed intermediate their ends with a relatively short outward bulge to provide an enlarged opening between said lengths of wire through which the enlarged portion of a knob-like projection on another utensil may pass so that the more narrowly spaced straight parallel portions of the handle at opposite ends of said enlarged opening may be moved into engagement under the enlarged portion of the knob-like projection whereby said handle may be detachably secured to said projection.

VERA M. WATTS.

References Cited in the file of this patent

UNITED STATES PATENTS

| Number | Name | Date |
|---|---|---|
| 626,023 | Hoage et al. | May 30, 1899 |
| 820,460 | Whittier | May 15, 1906 |
| 880,582 | Secrest | Mar. 3, 1908 |
| 906,677 | Beasley | Dec. 15, 1908 |
| 1,134,905 | Prochaska | Apr. 6, 1915 |
| 1,298,662 | Chadwick | Apr. 1, 1919 |
| 1,364,332 | Verstraete | Jan. 4, 1921 |
| 1,439,885 | Gorman | Dec. 26, 1922 |

FOREIGN PATENTS

| Number | Country | Date |
|---|---|---|
| 29,434 | Australia | Oct. 7, 1930 |
| 455,162 | Great Britain | Oct. 15, 1936 |
| 223,342 | Germany | June 17, 1910 |